Figure 1:
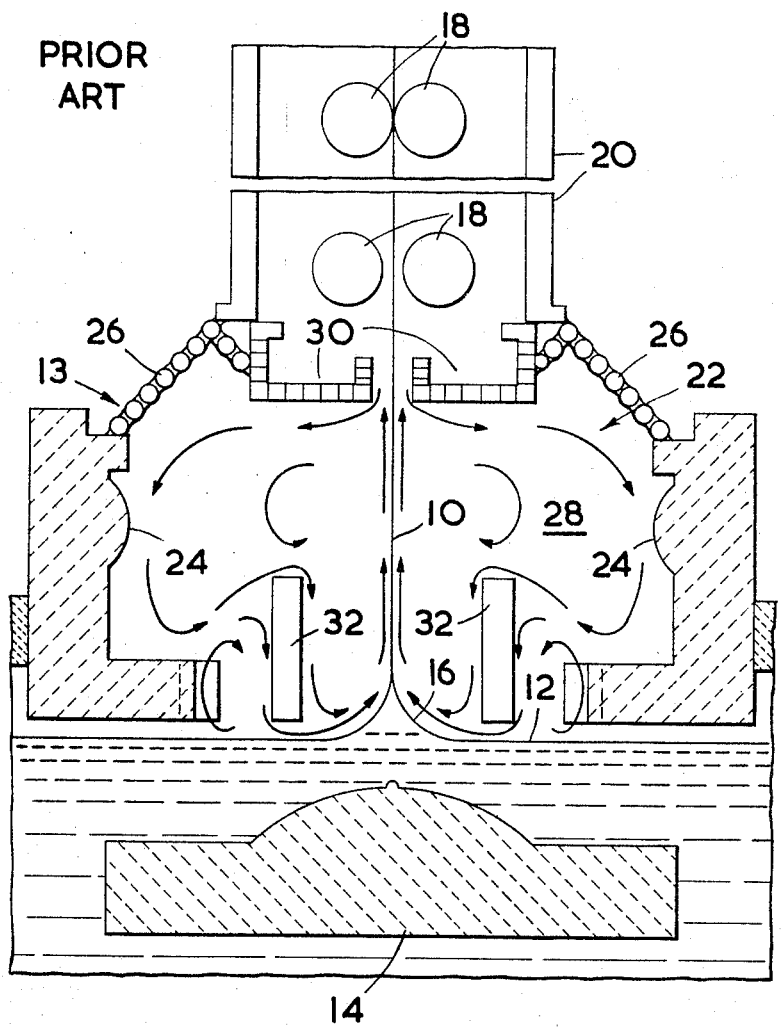

Sept. 20, 1966 J. M. PEETERS 3,273,990
GLASS DRAWING APPARATUS WITH PIVOTAL COOLER
Filed May 23, 1960 7 Sheets-Sheet 4

Sept. 20, 1966  J. M. PEETERS  3,273,990
GLASS DRAWING APPARATUS WITH PIVOTAL COOLER
Filed May 23, 1960  7 Sheets-Sheet 6

Sept. 20, 1966  J. M. PEETERS  3,273,990
GLASS DRAWING APPARATUS WITH PIVOTAL COOLER
Filed May 23, 1960  7 Sheets-Sheet 7

United States Patent Office 3,273,990
Patented Sept. 20, 1966

3,273,990
GLASS DRAWING APPARATUS WITH
PIVOTAL COOLER
Jean M. Peeters, St. Laurent, Quebec, Canada, assignor to Pittsburgh Plate Glass Company, Pittsburgh, Pa.
Filed May 23, 1960, Ser. No. 30,900
Claims priority, application Canada, Mar. 25, 1960, 795,380
1 Claim. (Cl. 65—202)

This invention relates to the manufacture of sheet glass by continuous drawing from a bath of molten glass and provides improved methods and apparatus for producing drawn sheet glass of improved appearance wherein the usual characteristic wave pattern, i.e. transverse thickness variations which appear as bands or ribs, extending generally in the direction of the draw, is eliminated or materially reduced.

These characteristic wave patterns primarily occur because of nonuniform cooling of the sheet across its width. To provide uniform cooling of the sheet, it is desirable to allow the heat loss to take place substantially entirely by radiation rather than by transfer to convection currents or a combination of radiation and a transfer to convection currents.

In conventional processes of drawing sheet glass, a natural stack is induced by the geometry of the sheet, bath and drawing chamber wherein there is a transfer of heat from the bath and sheet at relatively elevated temperatures to the cooler ambient air within the chamber producing a convection flow of air in the direction of the draw and out of the chamber. The movement of the heated air in the direction of the draw results in zones of reduced pressure at the base or meniscus of the sheet, so that colder air is drawn to the reduced pressure zones. Air enters the drawing chamber at the juncture of the chamber and the drawing machine and leaks into the chamber from cracks, crevices, or the like in the chamber walls. Colder air flowing to the zones of low pressure is chilled by moving generally across coolers, which are disposed within the chamber slightly above the surface of the bath and on the opposite sides of the sheet to accelerate the setting of the glass. As readily understood, the temperature of entering air will be nonuniform because of differences in temperature of the sources of this air and this condition will persist due to differences in paths taken by this air in the drawing chamber and, also, due to conditions within the kiln. These temperature differences cause nonuniform velocities within the drawing chamber. The colder air of nonuniform velocities flows to the reduced pressure zones and disturbs the relatively thin surface adhering film moving with the glass (commonly referred to as the "boundary layer") causing nonuniform heat transfer across the sheet, thereby affecting the formation of the glass in the area where the glass undergoes the transition from plastic to solid state. Being in the plastic state and under stress, the glass is unequally attenuated to form a characteristic longitudinal wave pattern.

Another characteristic wave pattern extends diagonally and usually exists on the outer margins of the sheet. This diagonal wave pattern may be so severe, in some instances, as to extend entirely across the sheet. The diagonal wave pattern, when superimposed on a longitudinal wave pattern provides a pattern referred to in the sheet glass industry as "batter" or "dapple," and is the result of currents of colder air flowing from the vicinity of the ends of the coolers and the ends of the drawing chamber to the zones of low pressure at the base of the sheet. These currents of air are commonly referred to as "end-around currents."

According to our copending application Serial No. 771,393 in the names of Robert A. James and Cecil R. Ward, the appearance of drawn sheet glass may be materially improved if the flow of air to and from the base of the sheet is controlled or regulated, so as to be diminished but not eliminated. This control or regulation of the flow of air to the base of the sheet does not eliminate but reduces the flow of air along the sheet in the direction of the draw. This reduction of flow of air to and from the base of the sheet eliminates or materially reduces the non-uniform disturbance of the boundary layer of air surrounding the sheet, so that variations in attenuation of the sheet are materially reduced, thus providing an improvement in the appearance of the sheet.

The provision of a protective envelope of air moving at a sufficiently low velocity in the direction of the draw results in a minimized cooling of the glass sheet by heat transfer through convection currents and thereby allows more uniform cooling of the sheet by radiation to the usual coolers spaced from the sheet and located slightly above the surface of the bath of molten glass. The end-around currents are also reduced and/or rendered ineffective, so that the usual diagonal wave pattern is greatly reduced. Thus, methods and apparatus have been devised for eliminating the undesirable effects of air currents which naturally occur in a sheet glass drawing device while retaining their desirable effects. Stated somewhat differently, methods and apparatus have been devised for reducing the flow of air to and from the base of a glass sheet being drawn to such a degree as to minimize undesirable effects, while yet retaining sufficient flow of air so as to form a protective envelope surrounding the sheet in the direction of the draw and obtain new desirable effects.

It is an object of the present invention to provide a new method and apparatus for minimizing the disturbance of the boundary layer of air adhering to a glass sheet drawn from a molten bath.

It has now been discovered that in a process where sheet glass is drawn from molten bath the undesirable effects of air currents prevailing around the zone of formation of the sheet glass may be minimized, with a resulting reduction of pattern in the sheet glass, by providing a drawing chamber closely surrounding the critical zone of formation of the sheet glass to define a single constricted channel for control of flow of air to and from said chamber, said channel being located adjacent the glass sheet and in the vicinity of the terminus of said zone of formation while substantially prohibiting access of air to said drawing chamber other than by way of said channel, and directing movement of air from the region adjacent said channel inside the drawing chamber generally downwardly and away from said glass sheet whereby to reduce the disturbance of the film of air adhering to a surface of said glass sheet within said drawing chamber.

Other features and objects of the invention will be evident from the following description.

Figure 2:
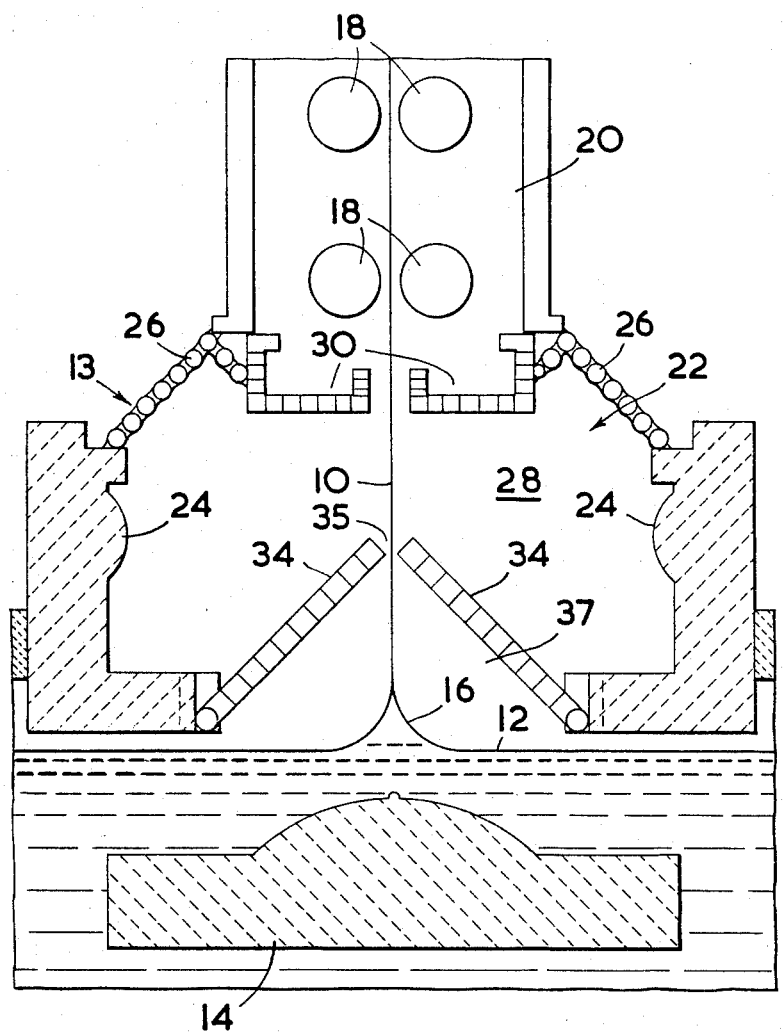
Figure 3:
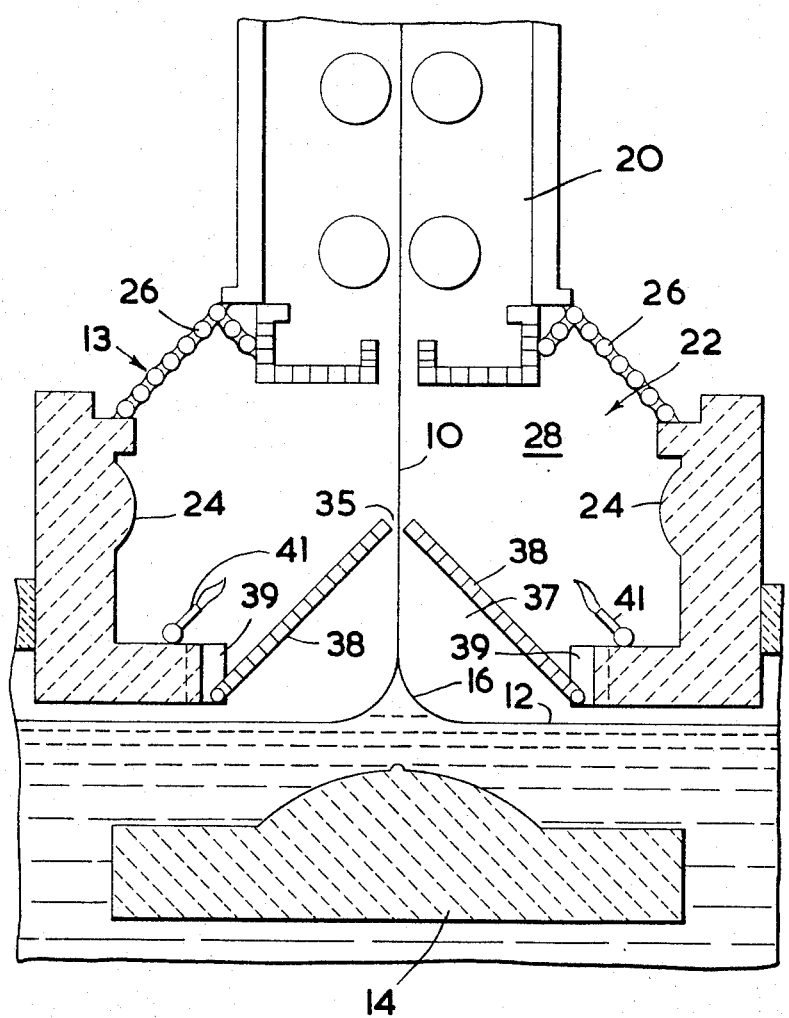
Figure 4:
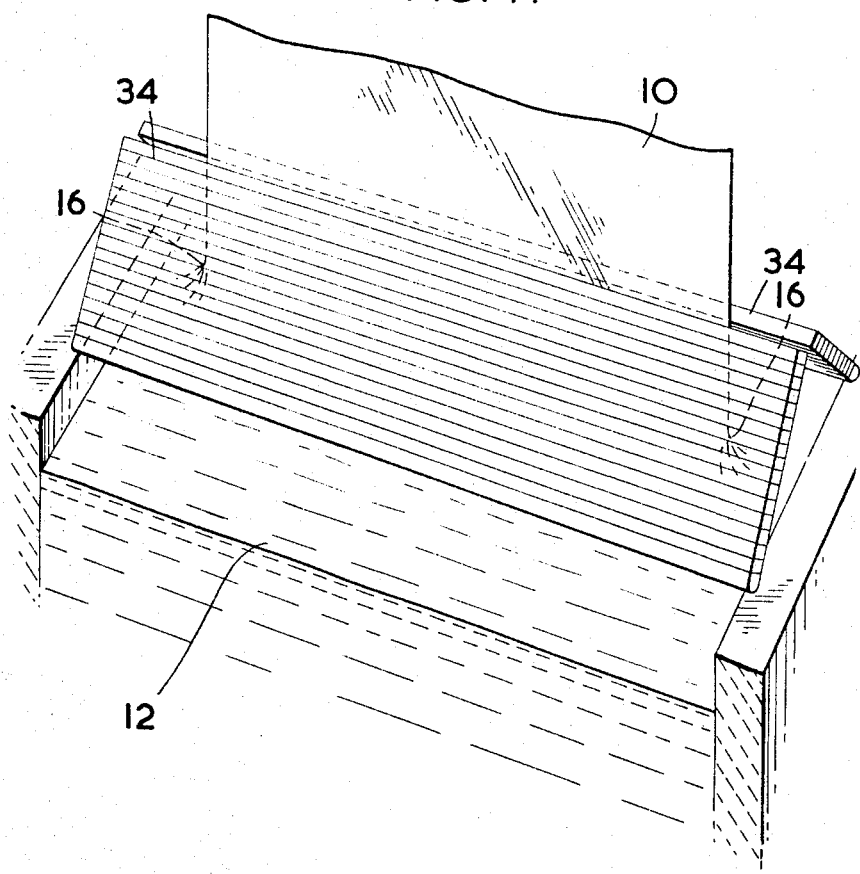
Figure 5:
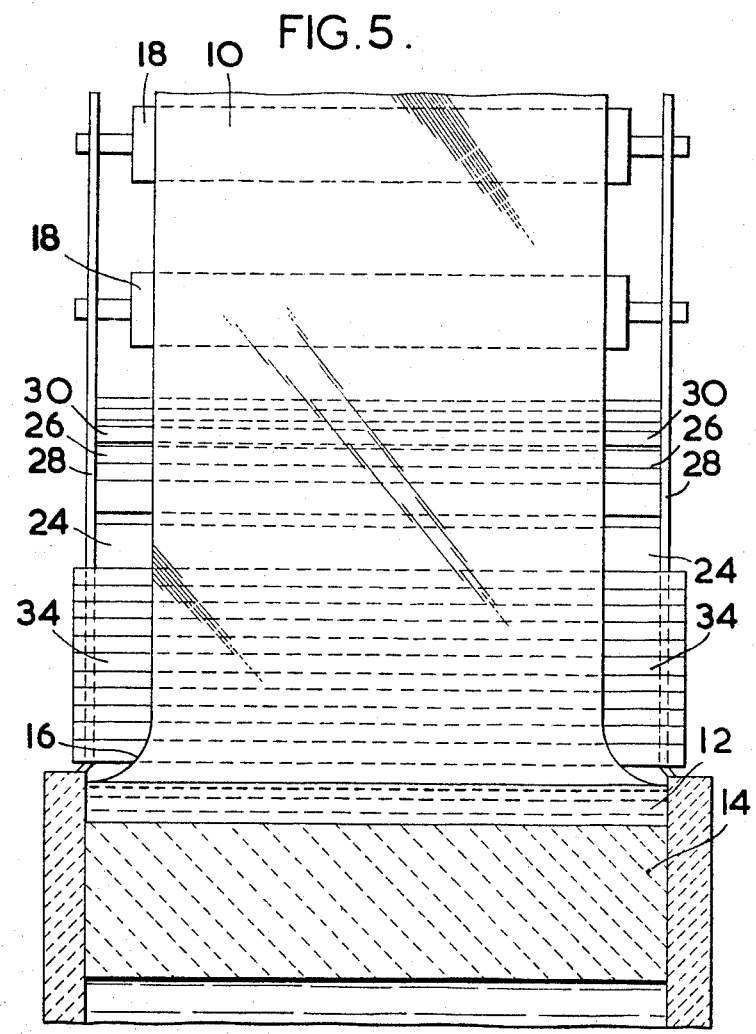
Figure 6:
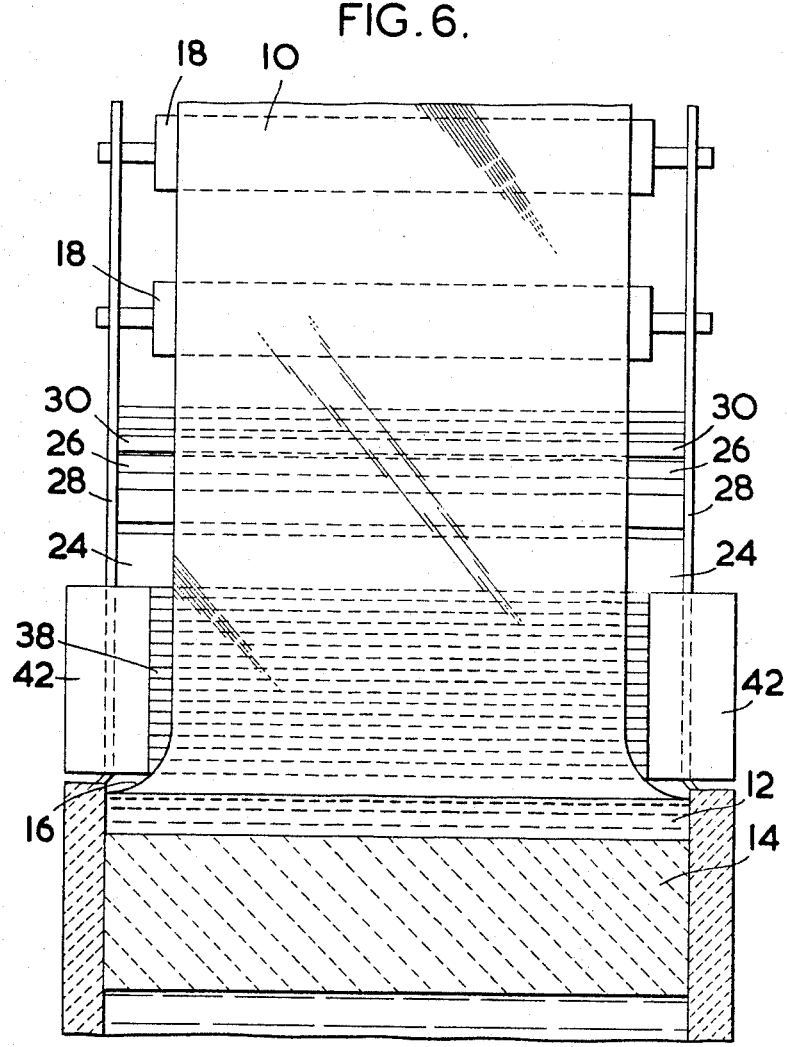
Figure 7:
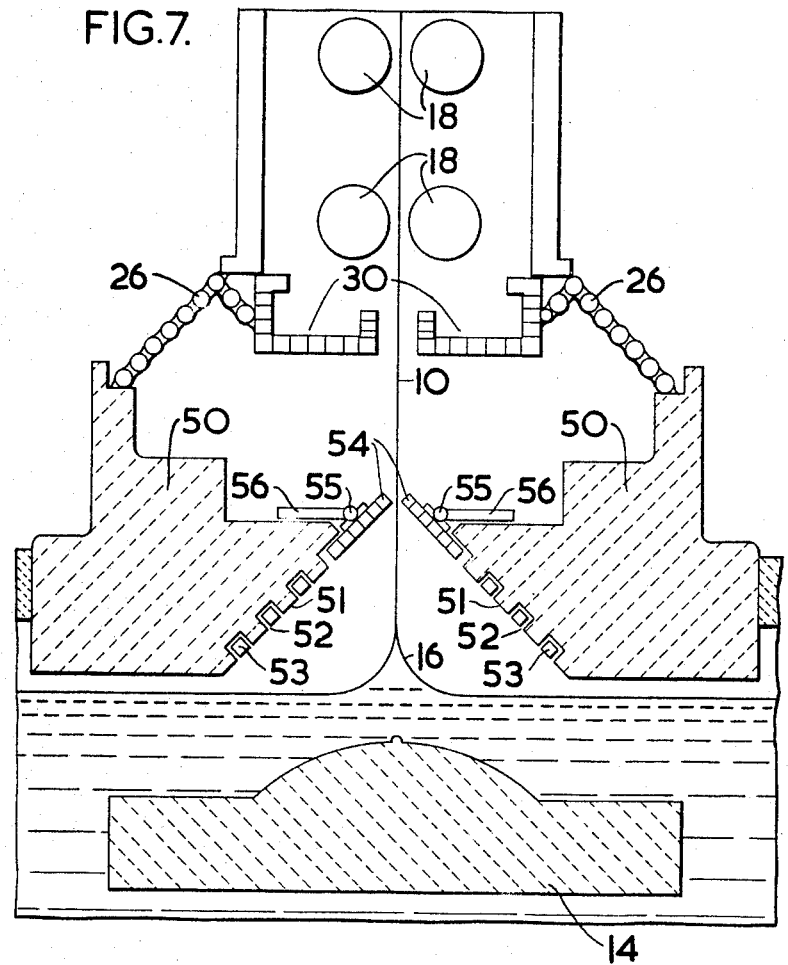
Figure 8:
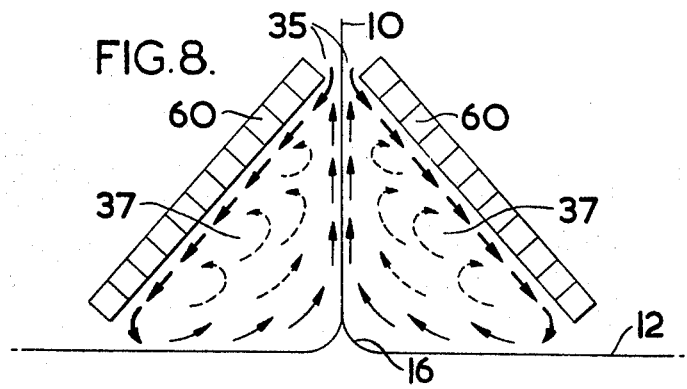

The invention will be described by way of illustration and without limitation with reference to the accompanying drawings wherein:

FIG. 1 shows diagrammatically a drawing kiln of a conventional prior art construction and the flow of principal air current therein, FIG. 2 shows diagrammatically the preferred embodiment of a drawing kiln according to this invention, FIG. 3 shows diagrammatically a second embodiment of a drawing kiln according to this invention, FIG. 4 shows diagrammatically a perspective view of coolers associated with the drawing kiln of FIG. 2 and their disposition with respect to the drawn sheet, FIG. 5 shows diagrammatically a side view of the drawing kiln of FIG. 2 in a plane at right angles to that of FIG. 2, FIG. 6 shows diagrammatically a side view of the drawing kiln of FIG. 3 in a plane at right angles to that of FIG. 3, FIG. 7 shows a diagrammatically a third embodiment of a drawing kiln according to this invention, FIG. 8 shows the flow of principal air currents within the drawing chamber of the drawing kiln of FIGS. 1, 3 and 6.

FIGS. 1, 2 and 3 each show a sheet of glass 10 being drawn from a bath 12 of molten glass in a drawing kiln generally indicated at 13 (only parts of which are shown but which is a conventional Pennvernon construction). A draw bar extending transversely of the kiln 13 is submerged in bath 12. Alternatively a conventional slotted draw bar could be use. The glass sheet 10 in its viscous condition forms a meniscus 16 with the surface of the bath 12, and the sheet 10 is drawn from the bath 12 and through the drawing chamber 22 of the kiln 13 by means of drawing rolls 18 of a conventional drawing machine generally indicated at 20. The drawing chamber 22, as depicted in the drawings, is defined by bath 12 and conventional L blocks 24, ventilator water coolers 26, end walls 28 and catch pans 30. The ventilator coolers 26 are each positioned between an L block 24 and the base framework of the drawing machine 20 and extend substantially to the end walls 28 of the kiln 13. The base of the drawing machine 20 is substantially closed by means of the generally U-shaped catch pans 30, which are formed as coolers and are positioned so as to catch broken glass which may drop in the machine and thus prevent entry of fragments in the bath 12. These catch pans 30 also extend substantially to the end walls 28 of the kiln 13 and are constructed for the passage of cooling fluid, such as water. One leg of each catch pan 30 is disposed substantially parallel to and spaced from the sheet 10.

In the prior art construction of FIG. 1 conventional water coolers 32 are provided for cooling sheet 10 by absorbing radiation therefrom. The coolers 32 are spaced above the surface of the bath 12 and are positioned on opposite sides of the sheet 10 to extend substantially the width of the sheet.

In the preferred embodiment of the present invention, shown in FIG. 2 a pair of inclined coolers 34 are sealed in hinged but airtight manner to the feet of the L blocks 24 and extend therefrom to within a short distance of the sheet 10 so as each to define a narrow channel 35 in the vicinity of the terminus of the end zone of formation of the sheet 10. FIG. 4 illustrates in perspective the manner of disposition of the coolers 34 with respect to the glass sheet 10. The ends of the coolers 34 extend transversely through the end walls 28 of the drawing kiln 13 as shown in FIG. 5 so as to prevent air from passing around the ends of the coolers.

The coolers 34 serve to define a relatively small drawing chamber 37 enclosing the meniscus 16 and the critical zone of formation of the glass sheet. Access of air to the chamber 37 and escape of air therefrom is substantially entirely by way of the channel 35.

In the embodiment of the invention according to FIG. 3 there is provided a pair of coolers 38 secured in hinged manner to the L blocks 24 like the pair of coolers 34 of FIG. 2. However, the coolers 38 are not sealed to the feet of the L blocks 24 in airtight manner but leave gaps 39 through which air can pass. This is sometimes inevitable when adapting a drawing kiln of the prior art for operation according to the present invention. Movement of air by way of the gaps 39 into the drawing chamber 37 defined by the coolers 38 is substantially eliminated by the provision of burners 41 adapted to create a steady but very slight upward flow of air in the vicinity of the gaps 39. The burners 41 may if desired be replaced by nozzles from which issues an upward flow of gas having a temperature above that of the ambient air.

Whereas in the construction of FIG. 2 the coolers 34 are themselves extended through end walls 28 of the drawing kiln 13, the ends of the coolers 38 of FIG. 3 extend only just beyond the width of the sheet 10 and airtight sealing between the ends of the coolers and the end walls of the kiln is effected by means of plates 42 secured to the ends of the coolers and extending through the end walls 28 as shown in FIG. 6.

The embodiments of FIGS. 2 and 3 essentially involve the application of the present invention to a drawing kiln of a conventional type. However, the part of the chamber 22 of FIGS. 2 and 3 lying outside the chamber 37 is now of lesser significance and can be dispensed with to a large extent. This is illustrated by the embodiment of FIG. 7.

In the construction of FIG. 7 the conventional L blocks 24 of FIGS. 1 to 3 are replaced by blocks 50 having inner surfaces 51 which are inclined with respect to the surface of the sheet 10. The inclined surfaces 51 are provided with channels 52 and coolers 53 are accommodated in these channels. Additional coolers 54 are pivotally mounted about pivots 55 secured to the blocks 50 by means of arms 56. The inclined surfaces 51 combine with the coolers 54 to present effectively continuous cooling surfaces defining a chamber 37 similar to that of FIGS. 2 and 3. The ends of the blocks 50 and the ends of the coolers 54 are sealed to the end walls 28 of the kiln so as to prevent movement of air into the chamber 37.

Each of the constructions of FIGS. 2, 3 and 7 provides a chamber 37 which encloses the critical zone of formation of the sheet 10. For an understanding of the latter phrase as used in the present context some discussion is necessary of the changes taking place in the physical properties of the glass between the time the glass is drawn from the meniscus 16 and the time at which it has been formed into a solid sheet.

At the meniscus 16 the temperature of the glass is of the order of 1700° F. and its flow properties are essentially those of a Newtonian liquid. As the glass travels upwardly it is cooled and begins to acquire viscoelastic properties until by the time its temperature has fallen to about 1500° F. the viscoelastic properties are predominant and the glass is said to be in the viscoelastic region. Between 1400° F. and 1300° F. the glass passes through what is known as the plastic region and does not acquire flow characteristics comparable to those of a true solid until the temperature has fallen to somewhere between 1300° F. and 1200° F.

Throughout the viscoelastic and plastic regions, within which the glass is still being stretched and is still gaining velocity, the glass is capable of having pattern imparted to it due to disturbances cause by currents of air flowing around it. However, when the glass has acquired flow characteristics where are predominantly those of a solid (which occurs approximately simultaneously with achievement of terminal velocity of the glass sheet), it will not acquire pattern whatever the behaviour of the air around it.

In the present disclosure, and the appended claims, the zone extending from the meniscus to the height of the glass sheet where solid flow characteristics prevail is known as the critical zone of formation of the sheet. The temperature range over which the critical zone of formation extends is from about 1700° F. to about 1200° F. The height of the terminus of the initial zone of formation of the glass sheet 10 is typically about 18 to 19 inches above the surface of the bath 12.

In each of the embodiments of FIGS. 2, 3 and 7 the chamber 37 has a constricted channel 35 for controlling flow of air to and from the chamber. Access of air to the chamber 37 other than by way of the channel 35 is substantially prohibited. In each case, the channel 35 is located just beyond the terminus of the critical zone of formation discussed above so that after emerging from the chamber 37 the surface of the sheet 10 is no longer susceptible to deformation by disturbances in the air around it. Therefore any formation of pattern on the sheet 10 must take place within the chamber 37 and is caused by air currents within this chamber.

Before discussing the nature of the air currents within the chamber 37 of FIGS. 2, 3 and 7 reference will again be made to FIG. 1 for the purpose of explaining the difference between the nature of the air flow within the chamber 37 and that to be found in a drawing kiln of the prior art.

In the arrangement of FIG. 1 the temperature of glass sheet 10 in its travel through chamber 22 is substantially above the general air temperature within chamber 22, so that sheet 10 induces air to flow in the direction of its draw and along its faces. This air flow creates low pressure zones in the vicinity of each side of the base 16 of sheet 10. The currents of air along the faces of the sheet are those which form the natural stack effect. The layer of air around the sheet moves at a substantially greater velocity than the sheet. To supply this stack flow of air there must be a supply of air flowing to the low pressure zones. A primary source of this air is the drawing machine. That air enters chamber 22 between sheet 10 and catch pans 30 at a temperature below that of sheet 10 and flows past the catch pans 30, which are constructed as coolers, the ventilator coolers 26 and the L blocks 24 between the end walls 28, all at a relatively low temperature, so that a zone on each side of sheet 10 and generally bounded by catch pan cooler 30, ventilator cooler 26, L block 24 and walls 28 becomes a secondary source of colder air. The temperature in this secondary zone will vary transversely thereof, being lower adjacent the end walls 28, so that air in different portions in this zone will also vary in temperature. Air from this zone flows to the low pressure zone at the base 16 on each side of sheet 10. The colder air from the secondary source flows downwardly and across the faces of coolers 32, being further chilled, and into the low pressure zone at the base of sheet 10, thereby providing a relatively large quantity of colder air and, more importantly, moving at relatively high velocities of different magnitudes to the low pressure zone. This colder air of different temperatures and velocities transversely of chamber 22 disturbs nonuniformly the air travelling with the sheet, resulting in the formation of the usual characteristic longitudinal wave pattern extending in the direction of the draw. End-around currents of colder air also flow to the low pressure zones at the base 16 of sheet 10 and disturb the air flowing with the sheet in the direction of the draw, thus resulting in the diagonal wave pattern.

Attention is particularly drawn to the important part played by the coolers 32 in causing vigorous flow of cold air towards the sheet 10. Air impinging upon the upper faces of the coolers 32 is cooled and therefore falls. As it falls it is further cooled by the lower sections of the coolers 32 with which it comes in contact with a resulting increase in density causing an increase of its downward velocity. By the time the air gets to the bottom of the coolers 32 it has not only been strongly cooled relative to the sheet 10 but has acquired a high velocity and so is diverted from the barrier constituted by the bath 12 with a high velocity. The natural stack about the hot sheet 10 tends to draw air towards it and this effect combines with the coolers 32 to set up a fast upward flow of cool air parallel to the surface of the sheet 10 which interacts with the boundary layer to produce local turbulence.

FIG. 8 illustrates schematically the very different type of air flow which prevails within the chamber 37 of FIGS. 2, 3 and 7. Cooling elements 60 represent the coolers 34 of FIG 2, the coolers 38 of FIG. 3 or the combination of the cooled inclined surfaces 51 and coolers 54 of FIG. 7. The hot sheet 10 induces a stack effect so that there is a continuous flow of air upwardly and parallel to the sheet 10. As air is withdrawn from the chamber 37 through the channel 35 due to this upward flow parallel to the sheet it is replaced by air flowing in between the coolers 60 and the sheet 10 through the channel 35, all other entrances being sealed as described. The air entering through the channel 35 is cooled by the coolers 60 and initially tends to fall vertically downwardly. As the air falls vertically downwardly towards the bath 12 it is subject to heating from the surface of the bath 12 and is therefore caused to rise again. This leads to the recirculation to the coolers 60 of air which has originally been cooled by them and has fallen downwardly and away from them to be reheated. Air which reaches the bottom of the coolers and then flows along the surface of the bath is partially drawn up by the stack about the sheet 10 to leave the chamber 37 and is partially recirculated to the coolers 60.

The combined effect of the three prime influences upon the air within the chamber 37, i. e. cooling by the coolers 60, heating by the surface of the bath 12 and attraction by the stack around the sheet 10 is to set up a flow of air within the chamber 37 substantially as indicated by the arrows in FIG. 8. These arrows have been depicted in heavy lines, lighter lines and broken lines in accordance with the variations in air velocity throughout the chamber 37. The heavy lines indicate high air velocity, the lighter lines intermediate air velocity and the broken lines low air velocity.

In accordance with the flow pattern illustrated by the arrows, air within the chamber 37 adjacent the terminus of the critical zone of formation is caused to flow initially generally downwardly and away from the sheet 10. The flow of air down the face of the coolers 60 is, however, not of the cascading nature described with respect to FIG. 1 but is far less precipitate for as soon as the downward velocity imparted to the air due to cooling increases beyond a certain limit the cool air moves downwardly away from the coolers to mix with warmer air and eventually to be recirculated to the coolers at a higher level with consequent loss of downward velocity. Thus the air flow at the base of the coolers 60 is of relatively low velocity.

The recirculation to the coolers of the air within the chamber 37 results in a continuous mixing of cool air with warmer air which assists in preventing the setting up of large temperature gradients within the chamber 37. The strength of convection currents within the chamber 37 is therefore minimized and the velocity of the air drawn to the sheet 10 is therefore low so that the air moving in the direction of the draw creates little disturbance of the film of air adhering to the surface of the sheet 10.

As previously mentioned there is a continuous flow of air into the chamber 37 by way of the channel 35 set up as a result of the air continuously flowing out of the channel with the sheet 10. Since the inward and outward currents of air passing through the channel 35 are in opposite directions they exert a retarding action on each other. Retarding of the inward flow is beneficial because it reduces the downward velocity of the air and facilitates lateral movement of it towards the coolers 60. More important however from the point of view of the invention is the fact that retarding of the outward flow acts in direct opposition to the effect of the stack about the sheet 10. The resulting decrease in velocity of the upward flow of air parallel to the sheet 10 still further reduces disturbance of the boundary layer of air adhering to the glass sheet.

Transverse flow of air across the drawing chamber 37 is substantially eliminated as a result of the sealing provided between the ends of the coolers 60 and the end walls 28 of the kiln as previously described so that such flow is not a source of disturbance of the boundary layer associated with the sheet 10.

It will be appreciated that the coolers used in accordance with FIGS. 2, 3 and 7 serve for radiation cooling of the sheet 10 just as do the coolers 32 of FIG. 1. However, the coolers of FIGS. 2, 3 and 7 have additional functions.

Firstly, they constitute walls of the chamber 37. Secondly, because of their inclination to the horizontal, the nature of cooling they exert on the air coming into contact with them is such as to result in a lower rate of flow of air to the foot of the sheet 10 than is the case when using the coolers 32.

Any type of coolers may be used in enclosing the chambers 37 of FIGS. 2, 3 and 7. If desired the faces of the coolers directed towards the sheet 10 may be formed to receive heat-absorbing pads. Regulation of the degree of radiation cooling can then be carried out by insertion or withdrawal of the pads.

In particular it is feasible to employ for the purposes of the present invention coolers of the kind described in copending application Serial Nos. 807,915 and 828,836 in the name of Cecil R. Ward.

As previously mentioned, the height of the terminus of the critical zone of formation of the glass sheet 10 is typically about 18 to 19 inches above the surface of the bath 12; the channel 35 is located just above this height. In order to improve the degree of control of flow of air through channel 35 this channel is made as narrow as possible. Generally it is possible to work with a channel width of the order of one inch and the process has actually been satisfactorily operated with a gap width as small as half an inch. However, the optimum choice of gap width is essentially decided by trial and error. Preferably the coolers are mounted in hinged manner so as to facilitate the provision of a large channel width during starting up and subsequent narrowing of the channel when drawing is under way.

What is claimed is:

Apparatus for drawing sheet glass from a meniscus at a free surface of a bath of molten glass comprising a drawing kiln adapted to contain the bath of molten glass, a pair of horizontally spaced L blocks, a drawing machine above said drawing kiln, a pair of coolers pivotally secured to adjacent edges of said L blocks and inclined upwardly and inwardly with respect to the level of said bath, directly to overlie the free surface of said bath, said coolers serving to define a drawing chamber closely surrounding the critical zone of formation of said sheet glass, the upper extremities of said coolers being at least as efficiently cooled as any other portions of said coolers and being located immediately adjacent opposite surfaces of said sheet glass to define a constricted channel located in the vicinity of the terminus of said zone of formation, said coolers extending downwardly and outwardly to a horizontal plane passing through said meniscus, said channel serving for passage of said sheet glass to said drawing machine and for control of flow of air to and from said chamber, said chamber being substantially sealed against access of air thereto and emergence of air therefrom other than by way of said constricted channel.

References Cited by the Examiner

UNITED STATES PATENTS

| | | | |
|---|---|---|---|
| 1,598,730 | 9/1926 | Koupal | 65—83 |
| 1,865,811 | 7/1932 | Amsler | 65—204 |
| 2,167,905 | 8/1939 | Pedersen et al. | 161—164 |
| 2,352,539 | 6/1944 | Halbach et al. | 65—84 |
| 2,475,773 | 7/1949 | Batchell | 65—119 |

FOREIGN PATENTS

| | | |
|---|---|---|
| 210,761 | 10/1957 | Australia. |
| 1,109,813 | 2/1956 | France. |
| 768,741 | 2/1957 | Great Britain. |

DONALL H. SYLVESTER, *Primary Examiner.*

CHARLES R. HODGES, *Examiner.*

D. CRUPAIN, *Assistant Examiner.*